United States Patent [19]
Tsubota et al.

[11] Patent Number: 5,467,442
[45] Date of Patent: Nov. 14, 1995

[54] IMAGE PROCESSING APPARATUS

[75] Inventors: Kazuo Tsubota; Syouichi Tahata, both of Hokkaido, Japan

[73] Assignee: Hudson Soft Co., Ltd., Hokkaido, Japan

[21] Appl. No.: 128,285

[22] Filed: Sep. 29, 1993

[30] Foreign Application Priority Data

| Sep. 30, 1992 | [JP] | Japan | 4-285156 |
| Sep. 30, 1992 | [JP] | Japan | 4-285157 |
| Oct. 9, 1992 | [JP] | Japan | 4-298069 |
| Oct. 14, 1992 | [JP] | Japan | 4-300671 |

[51] Int. Cl.⁶ .................................. G06F 15/00
[52] U.S. Cl. .................................. 395/135
[58] Field of Search ................... 395/131, 133, 395/135, 153, 154; 345/119, 120

[56] References Cited

U.S. PATENT DOCUMENTS 4,704,605  11/1987  Edelson .................... 340/728

Primary Examiner—Phu K. Nguyen
Attorney, Agent, or Firm—Lowe, Price, LeBlanc & Becker

[57] ABSTRACT

In an image processing apparatus, a plurality of different images are displayed simultaneously on a display screen. According to a first feature, a priority circuit determines a display order of images for each dot, the images being supplied from a variety of image generators. In accordance with the priority order, the images are displayed on a screen. According to a second feature, an image processing apparatus includes a register for specifying a key area to be displayed as being transparent. A plurality of images are synthesized in accordance with the data held in the register. According to a third feature, a video display processor (VDP) processes color data of an image to be displayed, and a video encoder unit synthesizes a plurality of images in a predetermined order of a display priority by a cellophane function. The cellophane function is controlled to be turned on and off for each unit of a predetermined data block.

5 Claims, 24 Drawing Sheets

F I G. 4

COLOR PALLET RAM

| COLOR PALLET ADDRESS | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|
| 0 | Y DATA ||||||||  U DATA ||||  V DATA ||||
| 1 | Y DATA ||||||||  U DATA ||||  V DATA ||||
| 2 | Y DATA ||||||||  U DATA ||||  V DATA ||||
| 3 | Y DATA ||||||||  U DATA ||||  V DATA ||||
| 001 | Y DATA ||||||||  U DATA ||||  V DATA ||||
| 011 | Y DATA ||||||||  U DATA ||||  V DATA ||||
| 095 | Y DATA ||||||||  U DATA ||||  V DATA ||||
| 105 | Y DATA ||||||||  U DATA ||||  V DATA ||||
| 115 | Y DATA ||||||||  U DATA ||||  V DATA ||||

FIG. 5

COLOR PALLET DATA 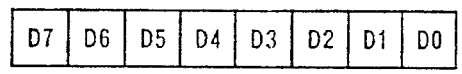

\+

COLOR PALLET ADDRESS
OFFSET × 2 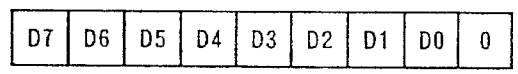

||

COLOR PALLET ADDRESS 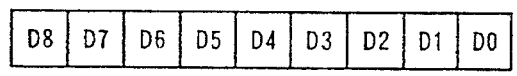

FIG. 6

| PICTURE | | D7 | D6 | D5 | D4 | D3 | D2 | D1 | D0 |
|---|---|---|---|---|---|---|---|---|---|
| VDP | SPRITE | PALLET BANK No. | | | | PALLET No. | | | |
| | BG | PALLET BANK No. | | | | PALLET No. | | | |
| CONTROL UNIT | 4 COLOR MODE | 0 | 0 | PALLET BANK No. | | | | PALLET No. | |
| | 16 COLOR MODE | PALLET BANK No. | | | | PALLET BANK No. | | | |
| | 256 COLOR MODE | PALLET No. | | | | | | | |
| IMAGE DATA EXTENSION UNIT (RL SCREEN) | 16 COLOR MODE | 0 | 0 | 0 | 0 | PALLET No. | | | |
| | 32 COLOR MODE | 0 | 0 | 0 | PALLET No. | | | | |
| | 64 COLOR MODE | 0 | 0 | PALLET No. | | | | | |
| | 128 COLOR MODE | 0 | PALLET No. | | | | | | |

FIG. 8
| LOW PRIORITY | MIDDLE PRIORITY | HIGH PRIORITY | FINAL IMAGE |
|---|---|---|---|
| 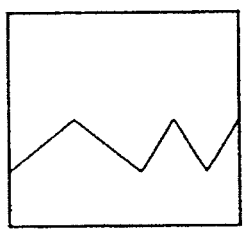 | 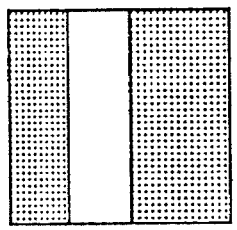 | 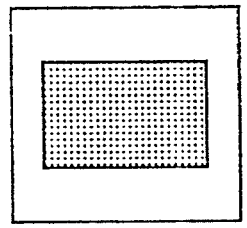 | 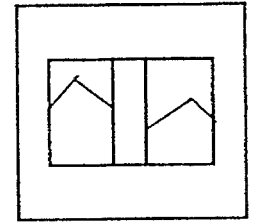 |
 : KEY color

F I G. 9 B

| | PICTURE | | |
|---|---|---|---|
| VDP | SPRITE | COLOR PALLET DATA | PALLET No. 0(ALL PALLET BANK) |
| | BG | COLOR PALLET DATA | PALLET No. 0(ALL PALLET BANK) |
| CONTROL UNIT (RL PICTURE) | 16M COLOR MODE | YUV DATA | Y DATA = 00h |
| | 64K COLOR MODE | YUV DATA | Y DATA = 00h |
| | 4 COLOR MODE | COLOR PALLET DATA | COLOR PALLET DATA 0 |
| | 16 COLOR MODE | COLOR PALLET DATA | COLOR PALLET DATA 0 |
| | 256 COLOR MODE | COLOR PALLET DATA | COLOR PALLET DATA 0 |
| | INVALID | INVALID | ANY DATA |
| IMAGE-DATA EXTENSION UNIT | IDCT | YUV DATA | SET COLOR OF REGISTER |
| | RL 16 COLOR MODE | COLOR PALLET DATA | PALLET No. 0 |
| | RL 32 COLOR MODE | COLOR PALLET DATA | PALLET No. 0 |
| | RL 64 COLOR MODE | COLOR PALLET DATA | PALLET No. 0 |
| | RL128 COLOR MODE | COLOR PALLET DATA | PALLET No. 0 |
| | INVALID | INVALID | ANY DATA |

FIG. 14
(ADDRESS REGISTER)

| MSB | | | | | | | | | | | | | | | LSB |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| * | * | * | * | * | * | * | * | * | * | * | A R | | | | |

FIG. 15
(STATUS REGISTER)

| MSB | | | | | | | | | | | | | | | LSB |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| DISP | O/E | RASTER COUNT | | | | | | | | | A R | | | | |

FIG. 16
(CONTROL REGISTER)

| MSB | | | | | | | | | | | | | | | LSB |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| * | RAIN | BMG3 | BMG2 | BMG1 | BMG0 | SP | BG | * | * | * | * | DCT | EX | DCC | |

FIG. 17

| DCC bit | | CONTENTS |
|---|---|---|
| bit 1 | bit 0 | |
| 0 | 0 | NON-INTERLACE  1FIELD=263LINE |
| 0 | 1 | NON-INTERLACE  1FIELD=262LINE |
| 1 | 0 | INTERLACE    1/2dot   NON-SHIFT |
| 1 | 1 | INTERLACE    1/2dot   SHIFT |

FIG. 18
(COLOR PALLET ADDRESS REGISTER)

| MSB | | | | | | | | | | | | | | | | LSB |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | |
| * | * | * | * | * | * | * | | C P A | | | | | | | | |

FIG. 19
(COLOR PALLET DATA WRITE REGISTER)

| MSB | | | | | | | | | | | | | | | | LSB |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | |
| | Y | | | | | | | U | | | | V | | | | |

FIG. 20
(COLOR PALLET ADDRESS OFFSET REGISTER 1)

| MSB | | | | | | | | | | | | | | | | LSB |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | |
| VDP SP COLOR PALLET ADDRESS OFFSET | | | | | | | | VDP BG COLOR PALLET ADDRESS OFFSET | | | | | | | | |

FIG. 21

(COLOR PALLET ADDRESS OFFSET REGISTER 2)

| MSB | | | | | | | | | | | | | | | LSB |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| CTRU BMG 1 COLOR PALLET ADDRESS OFFSET | | | | | | | | CTRU BMG 0 COLOR PALLET ADDRESS OFFSET | | | | | | | |

FIG. 22

(COLOR PALLET ADDRESS OFFSET REGISTER 3)

| MSB | | | | | | | | | | | | | | | LSB |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| CTRU BMG 3 COLOR PALLET ADDRESS OFFSET | | | | | | | | CTRU BMG 2 COLOR PALLET ADDRESS OFFSET | | | | | | | |

FIG. 23

(COLOR PALLET ADDRESS OFFSET REGISTER 4)

| MSB | | | | | | | | | | | | | | | LSB |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| * | * | * | * | * | * | * | * | IMAGE DATA EXTENSION UNIT COLOR PALLET ADDRESS OFFSET | | | | | | | |

FIG. 24
(PRIORITY REGISTER 1)

| MSB | | | | | | | | | | | | | | | LSB |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| * | * | * | * | * | IMAGE DATA EXTENSION UNIT | | | * | VDP SP | | | * | VDP BG | | |

FIG. 25
(PRIORITY REGISTER 2)

| MSB | | | | | | | | | | | | | | | LSB |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| * | BMG 3 | | | * | BMG 2 | | | * | BMG 1 | | | * | BMG 0 | | |

FIG. 26

| MSB | | | | | | | | | | | | | | | | LSB |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | |
| Y MAX | | | | | | | | Y MIN | | | | | | | | |

FIG. 27

| MSB | | | | | | | | | | | | | | | | LSB |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | |
| U MAX | | | | | | | | U MIN | | | | | | | | |

FIG. 28

| MSB | | | | | | | | | | | | | | | | LSB |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | |
| V MAX | | | | | | | | V MIN | | | | | | | | |

FIG. 29

| MSB | | | | | | | | | | | | | | | | LSB |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | |
| Y | | | | | U | | | | | | V | | | | | |

FIG. 30

| MSB | | | | | | | | | | | | | | | LSB |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| F/B | E/D | IDU | | CTRL BMG3 | CTRL BMG3 | CTRL BMG3 | CTRL BMG3 | CTRL BMG1 | CTRL BMG1 | CTRL BMG0 | CTRL BMG0 | VDP SP | VDP SP | VDP BG | VDP BG |

FIG. 31

| VDP BG bit | | CONTENT |
|---|---|---|
| 1 | 0 | |
| 0 | 0 | CELLOPHANE OFF |
| 0 | 1 | CELLOPHANE ON CELLOPHANE REGISTER 1A/B |
| 1 | 0 | CELLOPHANE ON CELLOPHANE REGISTER 2A/B |
| 1 | 1 | CELLOPHANE ON CELLOPHANE REGISTER 3A/B |

FIG. 32

| VDP SP bit | | CONTENT |
|---|---|---|
| 3 | 2 | |
| 0 | 0 | CELLOPHANE OFF |
| 0 | 1 | CELLOPHANE ON CELLOPHANE REGISTER 1A/B |
| 1 | 0 | CELLOPHANE ON CELLOPHANE REGISTER 2A/B |
| 1 | 1 | CELLOPHANE ON CELLOPHANE REGISTER 3A/B |

FIG. 33

| CTRLU BMG0 bit | | CONTENT |
|---|---|---|
| 5 | 4 | |
| 0 | 0 | CELLOPHANE OFF |
| 0 | 1 | CELLOPHANE ON CELLOPHANE REGISTER 1A/B |
| 1 | 0 | CELLOPHANE ON CELLOPHANE REGISTER 2A/B |
| 1 | 1 | CELLOPHANE ON CELLOPHANE REGISTER 3A/B |

FIG. 34

| CTRLU BMG1 bit | | CONTENT |
|---|---|---|
| 7 | 6 | |
| 0 | 0 | CELLOPHANE OFF |
| 0 | 1 | CELLOPHANE ON CELLOPHANE REGISTER 1A/B |
| 1 | 0 | CELLOPHANE ON CELLOPHANE REGISTER 2A/B |
| 1 | 1 | CELLOPHANE ON CELLOPHANE REGISTER 3A/B |

FIG. 35

| CTRLU BMG2 bit | | CONTENT |
|---|---|---|
| 9 | 8 | |
| 0 | 0 | CELLOPHANE OFF |
| 0 | 1 | CELLOPHANE ON CELLOPHANE REGISTER 1A/B |
| 1 | 0 | CELLOPHANE ON CELLOPHANE REGISTER 2A/B |
| 1 | 1 | CELLOPHANE ON CELLOPHANE REGISTER 3A/B |

FIG. 36

| CTRLU BMG3 bit | | CONTENT |
|---|---|---|
| 11 | 10 | |
| 0 | 0 | CELLOPHANE OFF |
| 0 | 1 | CELLOPHANE ON CELLOPHANE REGISTER 1A/B |
| 1 | 0 | CELLOPHANE ON CELLOPHANE REGISTER 2A/B |
| 1 | 1 | CELLOPHANE ON CELLOPHANE REGISTER 3A/B |

FIG. 37

| IDU bit | | CONTENT |
|---|---|---|
| 13 | 12 | |
| 0 | 0 | CELLOPHANE OFF |
| 0 | 1 | CELLOPHANE ON CELLOPHANE REGISTER 1A/B |
| 1 | 0 | CELLOPHANE ON CELLOPHANE REGISTER 2A/B |
| 1 | 1 | CELLOPHANE ON CELLOPHANE REGISTER 3A/B |

FIG. 38

| MSB | | | | | | | | | | | | | | | | LSB |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | |
| SPBF | SPBE | SPBD | SPBC | SPBB | SPBA | SPB9 | SPB8 | SPB7 | SPB6 | SPB5 | SPB4 | SPB3 | SPB2 | SPB1 | SPB0 | |

FIG. 39

| MSB | | | | | | | | | | | | | | | | LSB |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 | |
| * | * | * | * | Y COEFFICIENT | | | | U COEFFICIENT | | | | V COEFFICIENT | | | | |

IMAGE PROCESSING APPARATUS

BACKGROUND OF THE INVENTION

The present invention relates to an image processing apparatus, and more particularly to an image processor used in a-game computer system.

In a conventional game computer, an image processing operation is carried out mainly by an external memory, a CPU (central processing unit), a VRAM (video RAM), a VDC (video display controller), a VDE (video encoder) and a CRT. In this type of computer, image data are transmitted from the external memory to the VRAM, and are read from the VRAM by the CPU.

In one type of conventional game computer, each image is composed of background and sprite pictures, the background picture being formed in accordance with a character pattern defined by a raster of the CRT and character pitch. In the memory (RAM), the background and sprite images are managed by using background and sprite attribute tables BAT and SATB and character and sprite generators CG and SG, respectively.

The BAT is composed of a "CG color" of 4 bits and a "character code" of 12 bits, to specify positions and colors of the characters to be displayed. The CG is incorporated in the RAM for storing four actual character patterns corresponding to CG codes in the BAT. Each character pattern is defined by 8× 8 dots and 16 colors. The SATB is composed of a "sprite color" and a "pattern code," the pattern code specifying a corresponding SG. The SG defines an actual sprite pattern.

In such a game computer, an address of the raster position to be displayed is generated first, and then the character code and CG color are given in accordance with the address. An address of the CG is produced in accordance with the character code. The pattern data stored in the CG are read out in accordance with the CG address, and are transmitted with the CG color code to the following stage. The sprite pattern codes and SG color codes are read from the SATB in the order of the address. An address of the SG is produced in accordance with the sprite pattern code as well as the background image. When coordinate data specifying a display position or whole data of the SATB are changed, an image to be displayed on the CRT varies.

When the sprite and background image data are supplied to a priority circuit, these data are superimposed on each other in accordance with an instruction held in a priority register.

When display data including the CG pattern data, CG color code, SG pattern data and SG color code are supplied from the VDC to the VDE, the display data are converted to the RGB signal by a D/A converter in accordance with the contents of a color pallet RAM. The color pallet RAM stores RGB digital data written by the CPU.

FIG. 1 shows the structure of the color pallet RAM, which includes color pallets of "256 addresses×9 bits," and is divided into 16 blocks of "16 addresses×9 bits." The RGB data are stored in the 9 bit area. That is, each color of the RGB has data of 3 bits, and one dot is defined by one address. Each block has 16 colors selected from 256 colors. In the color pallet RAM, one of the color blocks is specified by the color code to selected 16 colors to be used from 256 colors, and a color to be used is specified from the 16 colors by the pattern data.

In the conventional game computer system, the background and sprite pictures are produced with the same dot cycle in the same unit so that they have the same format. Such background and sprite image data are transmitted to the priority circuit in synchronization with dot clocks, which are used for displaying the images on the CRT. If a variety of image data generators are used, however, the transmission timing must be changed depending on the image data, because many kinds of image data which need different processing times are supplied to the priority circuit.

Recently, a variety of kinds of image data have been required to be displayed in a multi media computer system. According to the conventional system, however, only colored image data are treated, that is, transparent image data are not treated.

In the conventional system, in order to realize fade-in and fade-out processing, generally, the next picture is faded in the CRT after the previous picture has been faded out from the CRT. Further, in order to realize cross fade processing, in which the previous picture is faded out from the CRT by fading the next picture in the CRT, the two pictures are controlled in brightness gradually (in analog fashion) by using an attenuator or the like.

The conventional computer system performs cellophane processing, in which upper and lower pictures (front and back cellophane) are synthesized by an arithmetic operation in accordance with predetermined priority information.

Cellophane arithmetic results Y, U and V are given by the following equations, where Ya, Ua and Va indicate data of a picture to be synthesized on Yb, Ub and Vb data, the Yb, Ub and Vb indicate data of a picture to be synthesized with the Ya, Ua and Va and my, mu, mv, nuy, nv and nu indicate cellophane coefficients, respectively:

$$Y = my \times Ya + ny \times Yb$$

$$U = mu \times (Ua-80h) + nu \times (Ub-80h) + 80h$$

$$V = mv \times (Va-80h) + nv \times (Vb-80h) + 80h$$

In the above equations, "80h" of the U and V are treated as "0". Each of the Y, U and V becomes "FFh" and "00h" if it is overflown and underflown, respectively.

According to the conventional computer system, however, the cellophane function is not performed for each sprite character.

SUMMARY OF THE INVENTION

It is an object of the present invention to provide a high performance image processing apparatus, in which a priority circuit may effectively process a variety of image data supplied from different kinds of image generators.

It is another object of the present invention to provide a high performance image processing apparatus, which may deal with a variety of color data including transparent image data.

It is still another object of the present invention to provide an image processing apparatus, by which a high performance cellophane function may be realized.

According to a first feature of the invention, a priority circuit determines a display order of images for each dot, the images being supplied from a variety of image generators. In accordance with the priority order, the images are displayed on a screen.

According to a second feature of the invention, an image processing apparatus includes a register for specifying a key area to be displayed as being transparent. A plurality of images are synthesized in accordance with the data held in the register.

According to a third feature of the invention, a video display processor (VDP) processes color data of an image to be displayed, and a video encoder unit synthesizes a plurality of images in a predetermined order of a display priority by a cellophane function. The cellophane function is controlled to be turned on and off for each unit of a predetermined data block (color pallet bank).

BRIEF DESCRIPTION OF THE DRAWINGS

FIG. 5 is an explanatory diagram showing a process for producing a color pallet address, in accordance with the invention.

FIG. 6 is a table showing color pallet data in accordance with the invention.

FIG. 8 is an explanatory diagram showing a chromakey process, according to the invention.

FIG. 9B is a table showing data chromakey processes of the VDP unit, control unit and image data extension unit, according to the invention.

FIGS. 14 to 16 and 18 to 25 are diagrams showing the configurations of an address register, status register, control register, color pallet address register, color pallet data write register, color pallet address offset register 1, color pallet address offset register 2, color pallet address offset register 3, color pallet address offset register 4 and two priority registers, respectively, according to the invention.

FIG. 17 is a table showing information on the interlace and non-interlace modes, according to the invention.

FIGS. 26 to 28 are diagrams showing the configurations of chromakey-Y, chromakey-U and chromakey-V registers, respectively, according to the invention.

FIG. 29 is a diagram showing the configuration of a fixed color register, according to the invention.

FIG. 30 is a diagram showing the configuration of a cellophane image setting register, according to the invention.

FIGS. 31 to 37 are diagrams showing detail of the cellophane image setting register, shown in FIG. 30.

FIG. 38 is a diagram showing the configuration of a special cellophane setting register, according to the invention.

FIG. 39 is a diagram showing the configuration of a cellophane coefficient register, according to the invention.

FIG. 41 is a diagram illustrating an image displayed in an interlace mode, according to the invention.

FIG. 42 is a diagram illustrating an image displayed in the interlace +½ dot shift mode, according to the invention.

DETAILED DESCRIPTION OF THE INVENTION

Hereinafter, an image processing apparatus of a preferred embodiment according to the present invention will be explained in conjunction with appended drawings.

Figure 1:
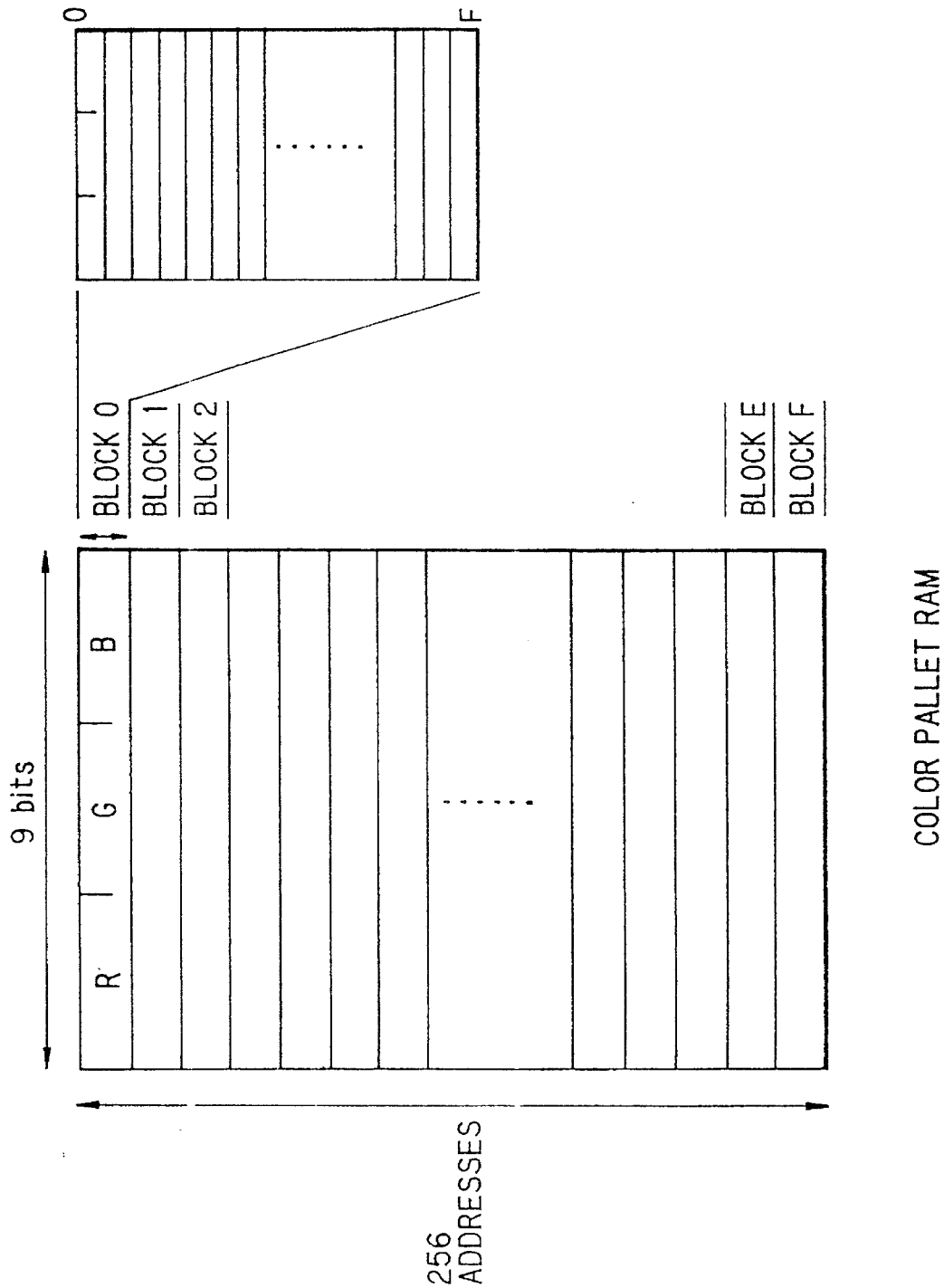
FIG. 1 is a diagram showing the configuration of a color pallet RAM.
Figure 2:
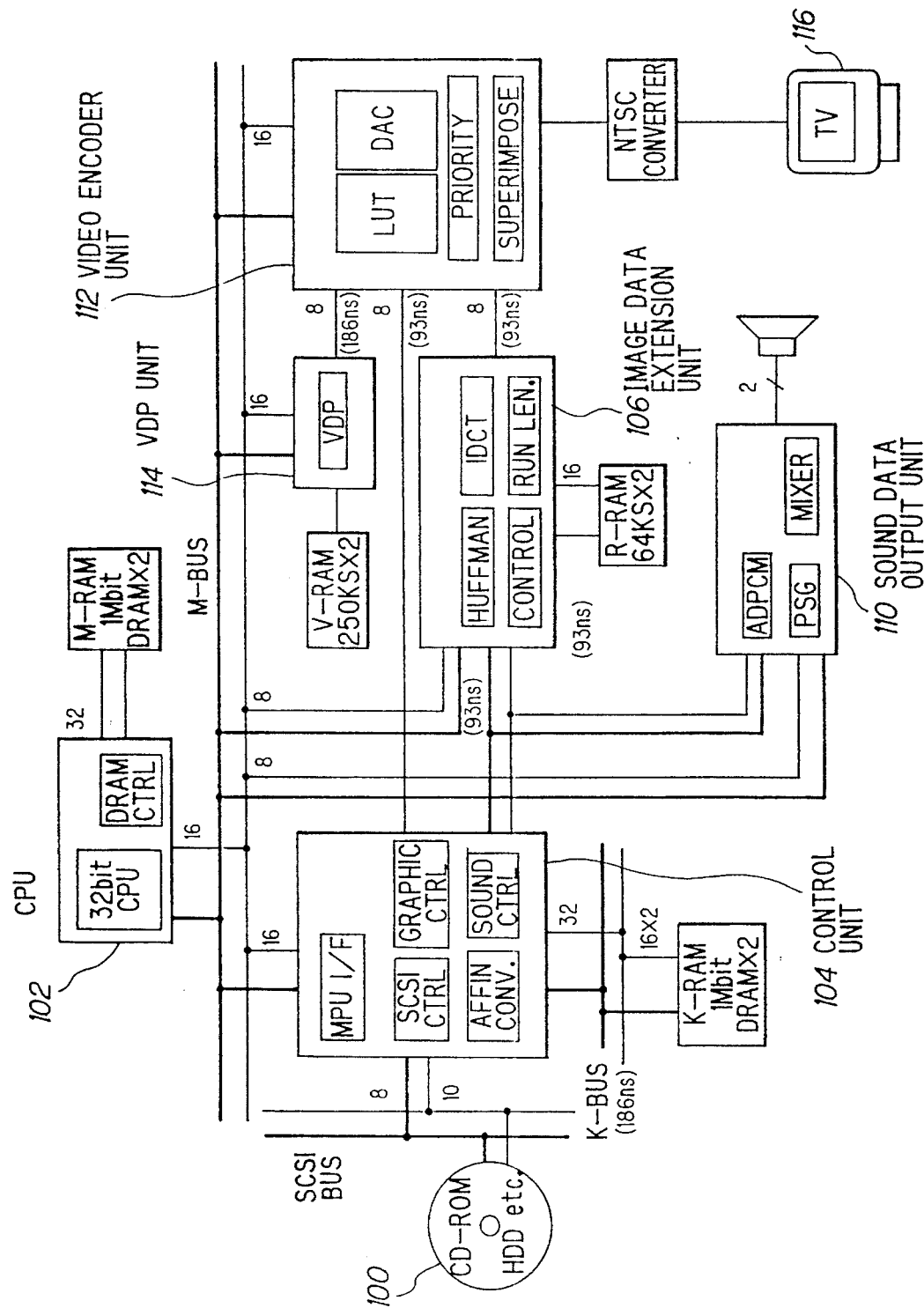
FIG. 2 is a block diagram showing a computer system according to the invention.

FIG. 2 shows a computer system of the preferred embodiment. The system includes a game-software recording medium 100 such as a CD-ROM, a CPU 102 of 32-bit type, a control unit 104 for mainly controlling transmission of image and sound data and interfacing most devices to each other, an image data extension unit 106, an image data output unit 108, a sound data output unit 110, a video encoder unit 112, a VDP unit 114 and a TV display 116. CPU 102, control unit 104, image data extension unit 106 and VDP unit 114 are provided with their own memories K-RAM, M-RAM, R-RAM and V-RAM, respectively.

CPU 102 directly controls a DRAM via a memory support, and performs communication through an I/O port to peripheral devices, that is, an I/O control function. CPU 102 includes a timer, a parallel I/O port and a interruption control system. VDP unit 114 reads display data which have been stored in the VRAM by CPU 102. The display data are transmitted to video encoder unit 112 whereby the data are displayed on the TV display 116.

Control unit 104 includes an SCSI controller to which image and sound data are supplied from CD-ROM 100 through an SCSI interface. Data supplied to the SCSI controller is buffered in the K-RAM. Control unit 104 also includes a DRAM controller for reading data which have been buffered in the KRAM, at a predetermined timing. In control unit 104, priority judgement is carried out for each dot of natural background image data, and an output signal is transmitted to video encoder unit 112.

Control unit 104 transmits moving image data (full color, pallet), which has been reduced, to image data extension unit 106 whereby the scale-down data are extended. The extended data are transmitted from image data extension unit 106 to video encoder unit 112.

Video encoder unit 112 superimposes VDP image data, natural background image data and moving image data (full color, pallet) transmitted from VDP unit 114, control unit 104 and image data extension unit 108, respectively. Video encoder unit 112 performs color pallet reproducing, special effect processing, D/A converting and the like. Output data of video encoder unit 112 are encoded into an NTSC signal by an external circuit.

ADPCM sound data which have been recorded in CD-ROM 100 are buffered in the K-RAM and then transmitted to sound data output unit 110 by control unit 104. The sound data are reproduced by sound data output unit 110.

Figure 3:
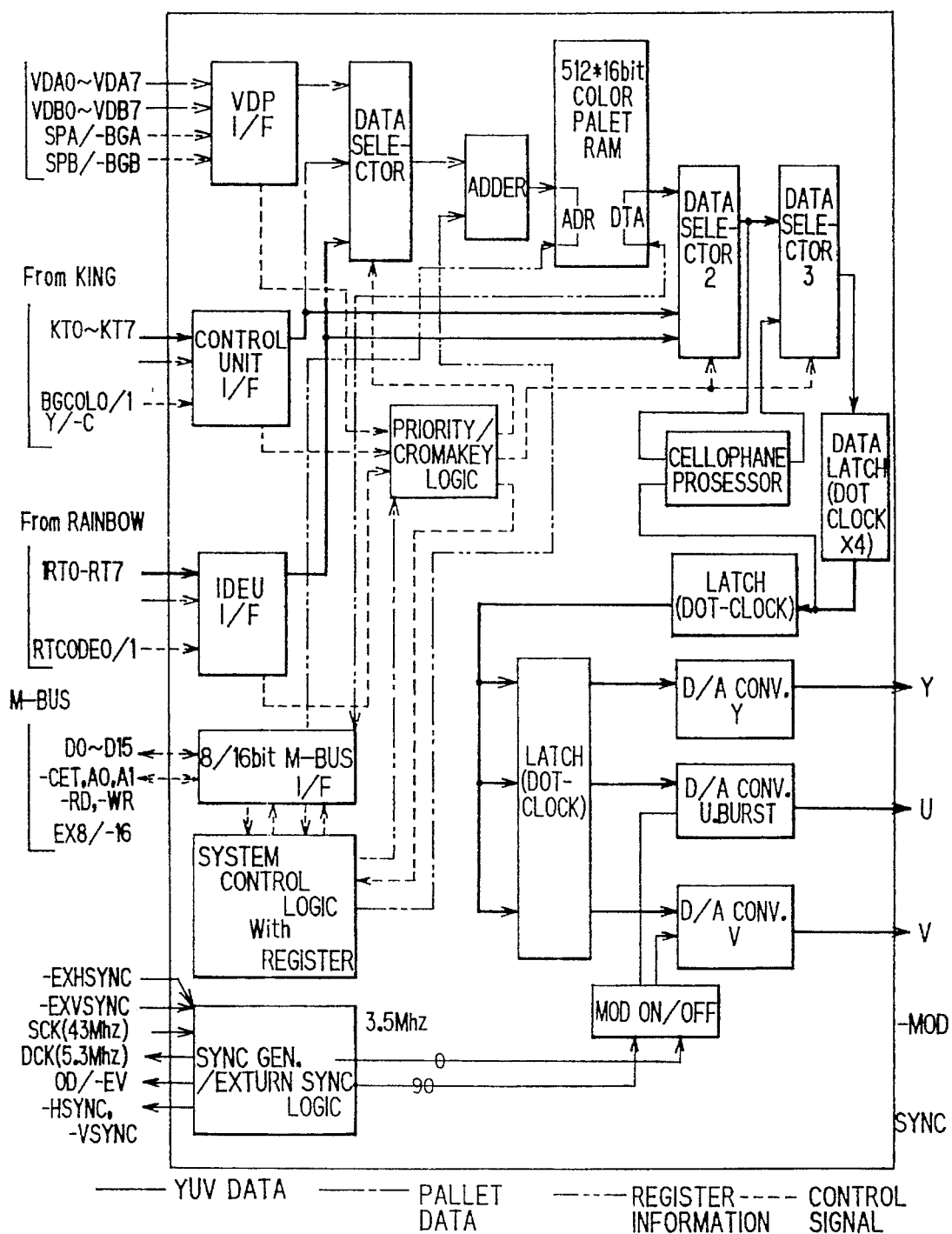
FIG. 3 is a block diagram showing a video encoder unit in the computer system shown in FIG. 2.

FIG. 3 shows the video encoder unit, which is composed of an IC including a synchronizing signal generating circuit, a color pallet RAM, a priority arithmetic circuit, a cellophane arithmetic circuit (for synthesizing upper and lower pictures), a D/A converter for an image signal, an 8/16 bit data bus (M-bus) interface, a VDP interface, a control unit interface and an image data extension unit interface.

The 8/16 bit data bus interface is an I/F switching circuit which selects one from 8 and 16 bit data buses to be used for data processing at the video encoder unit side. The selection is carried out in accordance with data width of the data bus of the processing system including the CPU.

The VDP interface receives data transmitted from two of upper and lower VDPs. Normally, the VDP interface receives data from the upper VDP. The VDP interface receives data from the lower VDP only when the upper VDP supplies chromakey data.

The color pallet RAM transforms a video input signal into a YUV digital signal.

The video encoder unit has registers (16 bits×24 lines), which are accessed by the CPU to set an operation mode therein, and to specify read and write modes for the color pallet.

Figure 4:
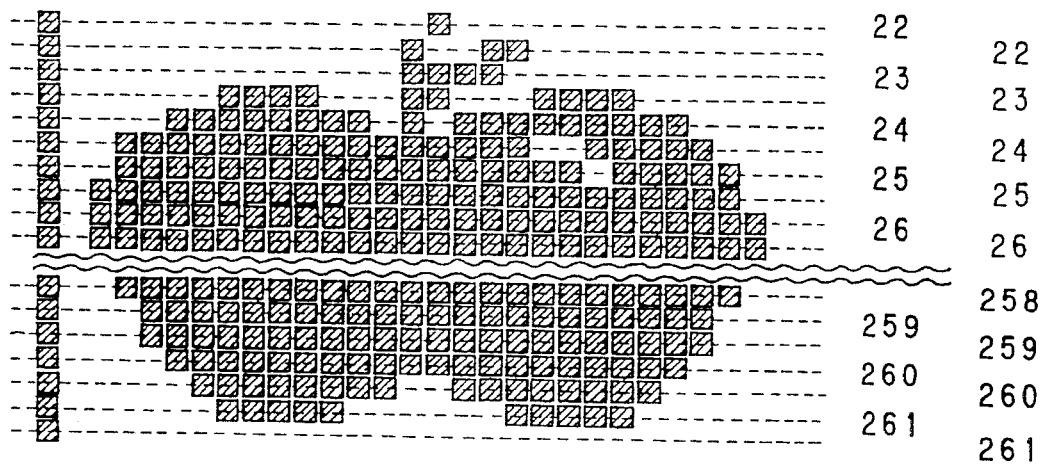
FIG. 4 is a diagram showing the configuration of a color pallet RAM, accordance to the invention.
Figure 4:
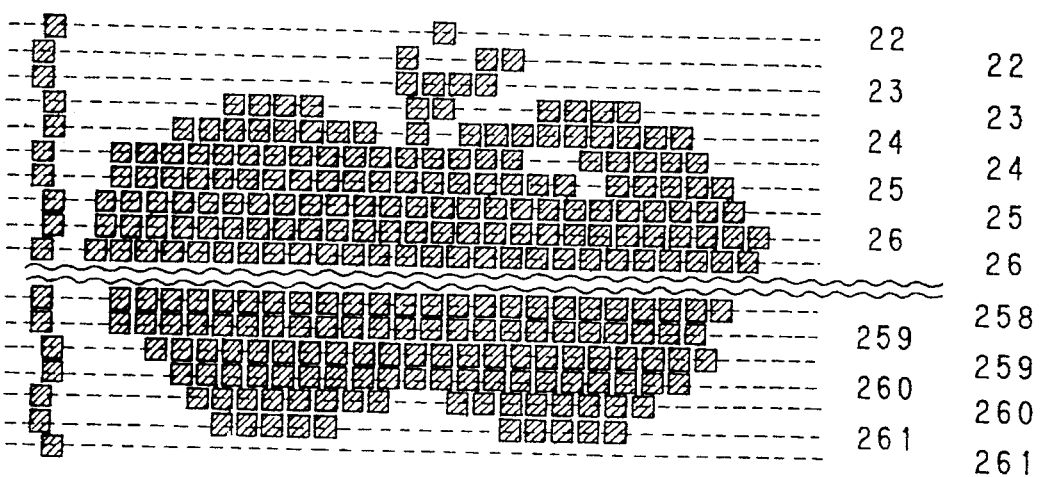

The color pallet RAM transforms color pallet data into YUV data to be actually displayed, as mentioned before. As shown in FIG. 4, the color pallet RAM includes a color information table divided into 512 address regions each having one color and 16 bit data regions. Each color data are composed of 8 bits "Y", 4 bits "U" and 4 bits "V", so that 65536 colors may be available. The "Y" data indicate brightness in a range 00 (black) to FF (white), the "U" data indicate color difference for a blue-to-yellow family in a range 0 to 15, and the "V" data indicate color difference for a red-to-green family in a range 0 to 15. Each of the U and Y data are set at a value 8 when no-color is represented. After the reset process, YY=00h, U=0h and V=h are automatically set at the "0" of the color pallet address. For that reason, color data need to be set at the address 0 again after the reset process.

How to set the YUV data at the color pallet RAM is now explained. The contents of the color pallet RAM are formed by the CPU, and are read in accordance with color pallet information from the VDP, control unit and image data extension unit. The read data are transformed into the Y, U and V data. The CPU can read the contents of the color pallet RAM.

The data are written in the color pallet RAM continuously in accordance with the following steps:

1st step : Setting a register number "01h" of a color pallet address register (CPA) in an address register (AR).

2nd step : Writing a start address in the color pallet address register (CPA).

3rd step: Writing a register number of a color pallet data write register (CPW) in the address register (AR).

4th step : Writing data in the color pallet data write register to increment the CPA.

5th step : Writing data in the color pallet data write register again to increment the CPA.

In the 8 bit bus mode, data are written in the data write register in the order of lower to upper bytes. After the upper bytes data are written in the data write register, the data are written in an internal register, and the CPA is incremented.

Next, how to display the color pallet data will be explained. The color pallet data stored in the VDP, control unit and image data extension unit are transformed to the YUV data in accordance with the contents of the color pallet RAM to form an actual image. All screens using the color pallet data are treated by the common color pallet RAM because only one color pallet RAM is provided. If a color pallet address offset register is used, color pallet start addresses may be specified for each picture separately.

In a priority process block, a picture to be displayed is specified for each dot. If the specified picture is a color pallet data picture, a color pallet address offset value of the picture is read from the register. After that, double the offset value is added to the color pallet data to provide a color pallet address. In accordance with the color pallet address, the color data Y, U and V are generated for each dot, and are transmitted to the following stage.

Even though the same color pallet data are used for the different pictures, different colors may be generated for the pictures.

The VDP has only one color pallet offset register, so that if plural VDPs are used, the plural VDPs have to use the single register in common. If the color pallet address is over 511, the tenth bit is omitted, that is, the ninth bit is connected to 0 address, as shown in FIG. 5. When the CPU accesses the color pallet RAM directly, the color pallet address offset is not effective.

FIG. 16 shows the contents of color pallet data transmitted from each of the LSIs. In a calculation of a color pallet address, a pallet bank number is treated as the first bits of a pallet number, that is, the pallet and pallet bank numbers are not distinguished from each other. Therefore, all 8 bits data in each mode are treated as the color pallet data.

In this preferred embodiment, the VDP unit treats two kinds images of the sprite (SP) and background (BG), the control unit treats four images BMG0, BMG1, BMG2 and BMG3, and the image data extension unit treats an IDCT/RL image, respectively. The video encoder unit may be connected with the upper and lower VDPs. If both the upper and lower VDPs are connected to the video encoder, one of the VDPs is selected to be connected at an input interface portion. The upper VDP is generally selected and the lower VDP is selected only when the upper VDP supplies chromakey data.

The priority order of the SP and BG images of the VDP and the pictures BMG0 to BMG3 can not be changed only by the priority register of the video encoder unit. Therefore, if the priority order is changed, all the units must be changed.

The priority order is decided for each dot by the video encoder unit in accordance with image information, the value of the priority register, whether the color is chromakey, and the like, the image information being transmitted from the VDP, control unit and image data extension unit.

Figure 7:
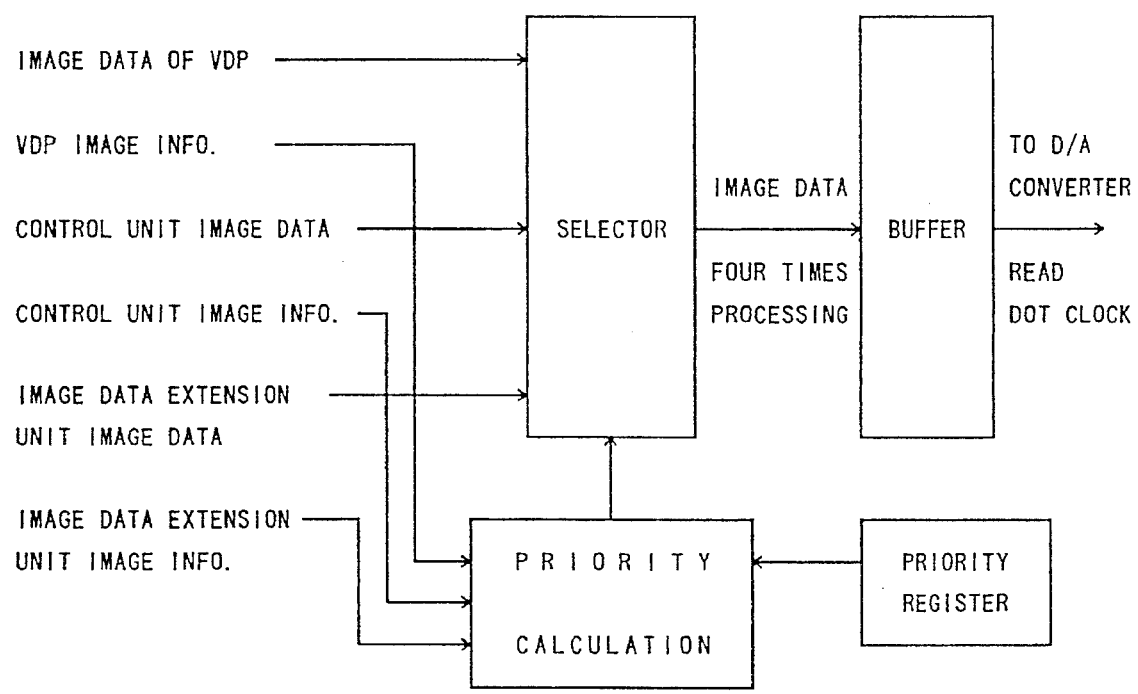
FIG. 7 is an explanatory diagram showing a priority process in a 256 dots mode, according to the invention.

FIG. 7 shows priority processing in the 256 dots mode. In this embodiment, the priority process is carried out using a clock of four times the dot clock, in addition to special processes such as the chromakey process and cellophane process. In the cellophane process, upper and lower pictures (front and back cellophane) are synthesized when the video encoder synthesizes some images in accordance with the priority.

In the 320 dot mode, each of the control unit and image data extension unit has 256 dots and the VDP has 320 dots. Therefore, an image to be displayed is specified in the period of 21 MHz and the image (device) is displayed immediately.

In the chromakey function (transparency process), some portions of an image are treated as transparency portions, on which low priority pictures are displayed. Actually, a color to be judged as a transparency (key color) is defined in advance. The key color differs depending on the type of data, color pallet data, IDCT-YUV data or YUV data of the control unit. To use no chromakey function is equivalent to use no key color when a picture to be displayed is drafted.

FIG. 8 shows operation of the chromakey function. If a color pallet data 0 (pallet number 0 in VDP) is used as the key color, the color pallet data 0 is treated as a transparency color at the run-length region in the control unit and image data extension unit in any mode. In the VDP, regions of pallet number 0 are treated as transparency at any color pallet bank.

Figure 9A:
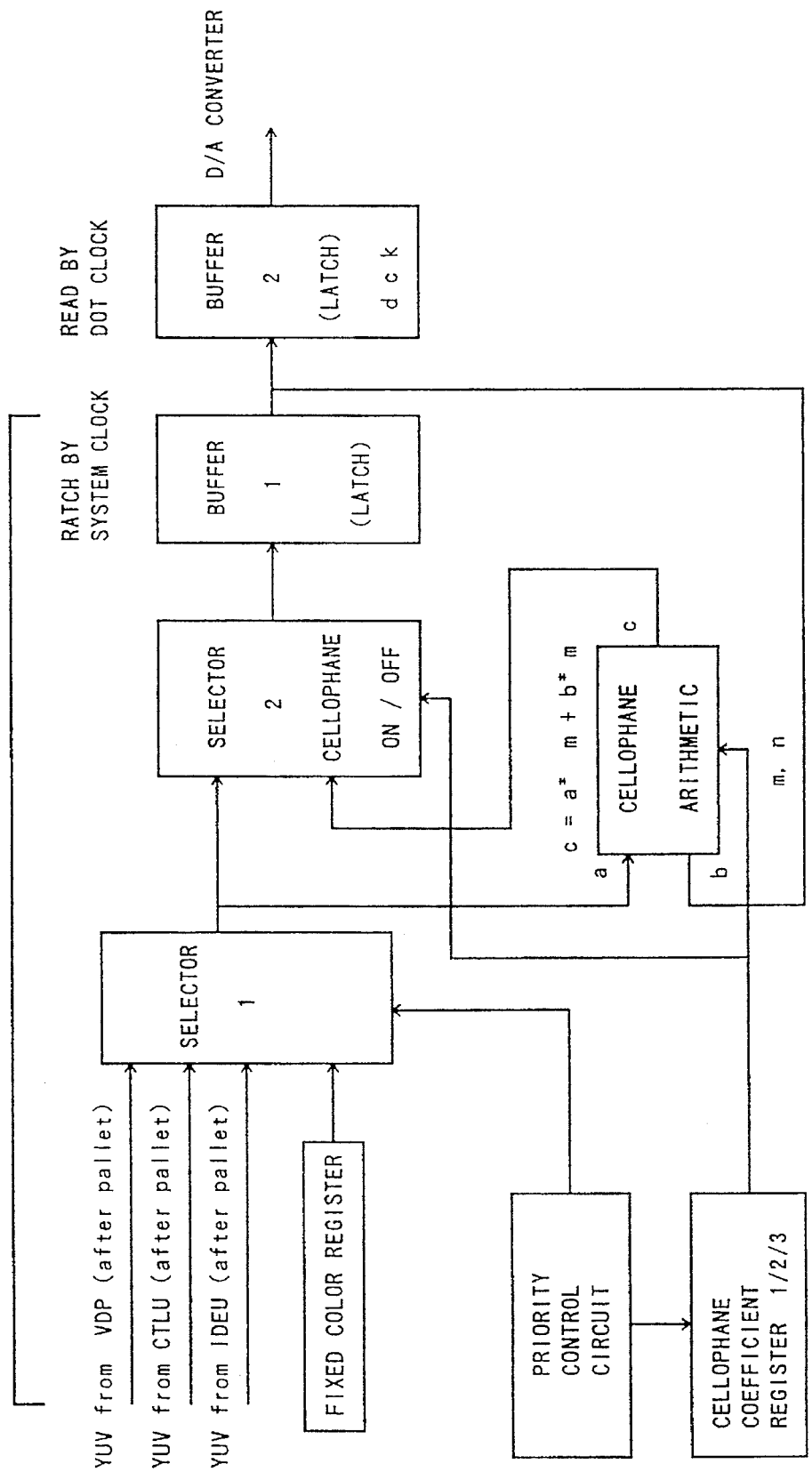
FIG. 9A is a block diagram showing a cellophane function according to the invention.

FIGS. 9A and 9B show the above mentioned chromakey operation. In some cases, the control unit performs chromakey judgement and supplies an invalid signal to the color pallet data picture. If Y-data of YUV data are set "00h" on a dot in the control unit (in the 16M color mode and 64K color mode), the dot is displayed with transparency color independently of values for U and V data. A value of "01h" or the like is added to the Y-data at regions not to be displayed with transparency in order that the Y-data does not have a value "00h". If an intermediate color located between a chromakey highest register value and a chromakey lowest register value is selected as the key color for the IDCT-YUV data screen and all of the YUV values to be displayed are located between the two register values, the selected color is judged as the key color, and as a result, the region is displayed with transparency color.

Specifically, in the case where the highest and lowest values of the chromakey Y register are Yu and Yl, the highest and lowest values of the chromakey U register are Uu and Ul, the highest and lowest values of the chromakey V register are Vu and Vl and Y, U and V values to be displayed are Ys, Us and Vs, a color to be displayed is the key color if all of the following equations are true.

$Yu >= Ys >= Yl$ $Uu >= Us >= Ul$ $Vu >= Vs >= Vl$

When invalid signals are transmitted from the control unit and image data extension unit to the video encoder, the dots corresponding to the invalid signals are treated the same as the case of key color, that is, the dots are displayed with transparency color. The chromakey portion on the lowest priority region is displayed with a color which will be used for the following portion in accordance with the priority process. Therefore, the following picture is displayed instead of the present one if all pictures including YUV data pictures are transparency. In the same manner, the chromakey region on the lowest priority picture is cellophane processed.

Figure 10:
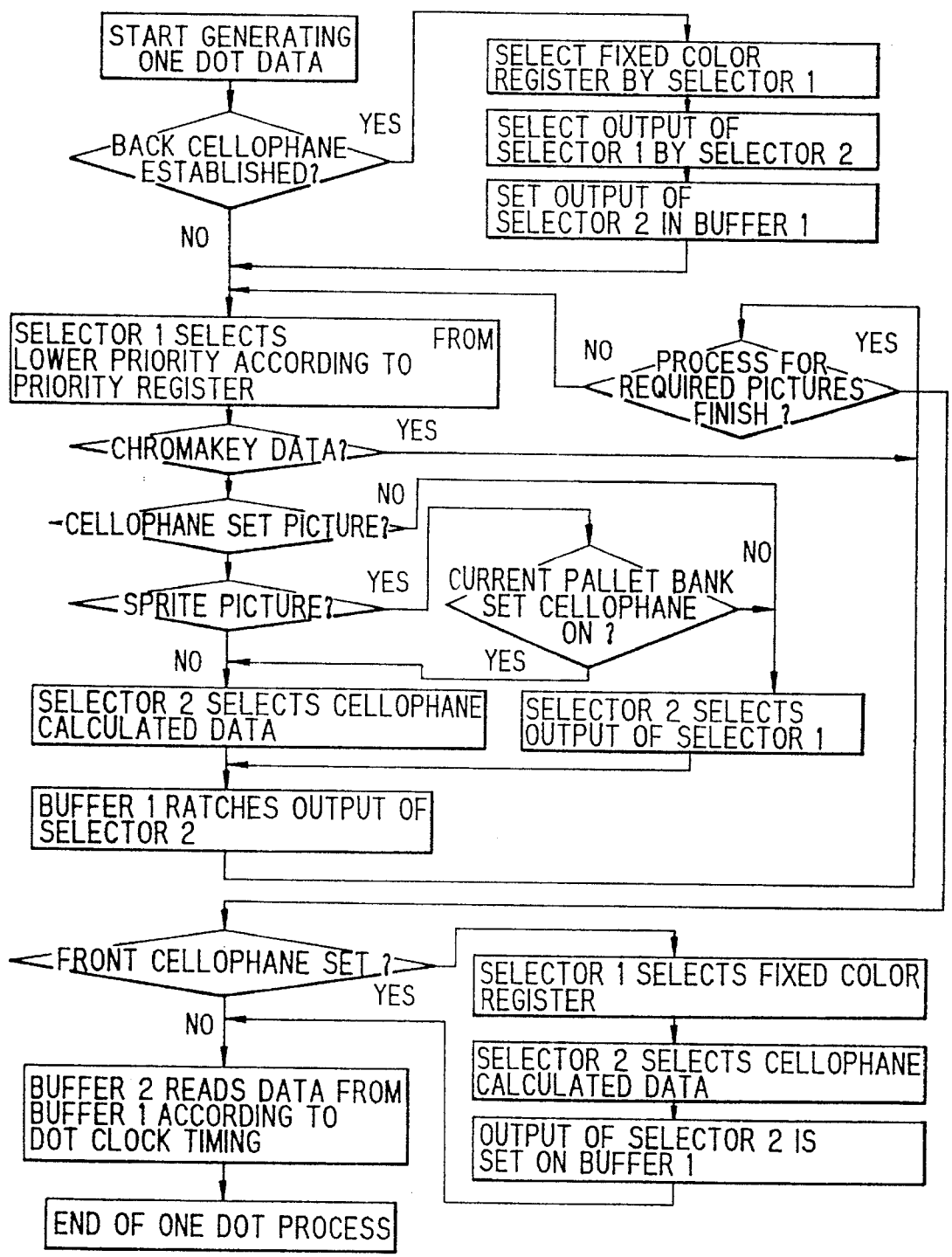
FIG. 10 is a flow chart showing operation of the cellophane function, according to the invention.

FIG. 10 shows the cellophane function, which is for superimposing upper and lower pictures in accordance with the priority information stored in the video encoder. In the operation of cellophane function, when the cellophane function is set at 0 picture in the control unit, a lower priority picture is mixed with the 0 picture, so that the 0 picture is displayed with half-transparency color. It is possible to realize fade-in processing, fade-out processing and smoothly changing of pictures by varying the mix ratio of the cellophane function.

The cellophane coefficient may be divided into 9, % to %so that the cellophane coefficient may be varied by changing the numerator. The cellophane coefficient is established by certain software.

A cellophane coefficient register is provided with 3 regions each having 6 parameters. When the cellophane function is set to a certain picture, the cellophane coefficient number (1 to 3) is written in a specified portion of the register. If "0" is set at the specified portion, the picture is separated from the cellophane function. Values 9 to F for the cellophane coefficient register are not supported.

The cellophane arithmetic is not carried out to a chromakey portion of a picture to be overlapped with another picture, so that the general chromakey process is carried out to the overlapped picture. According to the cellophane function, it is possible to realize functions of multi-cellophane, front cellophane, back cellophane and sprite special. In the multi-cellophane function, the cellophane process is carried out again on a picture which has been processed by the cellophane function. In the front cellophane function, the whole screen is changed in color and in brightness by the cellophane function using a pre-selected color. In the back cellophane function, the cellophane process can be carried out on a picture having the lowest priority. In the sprite special process, the cellophane function can be used on the sprite picture for each pallet bank.

According to a sprite special function, the cellophane function on the sprite image may be controlled ON and OFF in accordance with a pallet bank number of the sprite image. That is, the cellophane arithmetic operation may be controlled for each pallet bank number.

Figure 11:
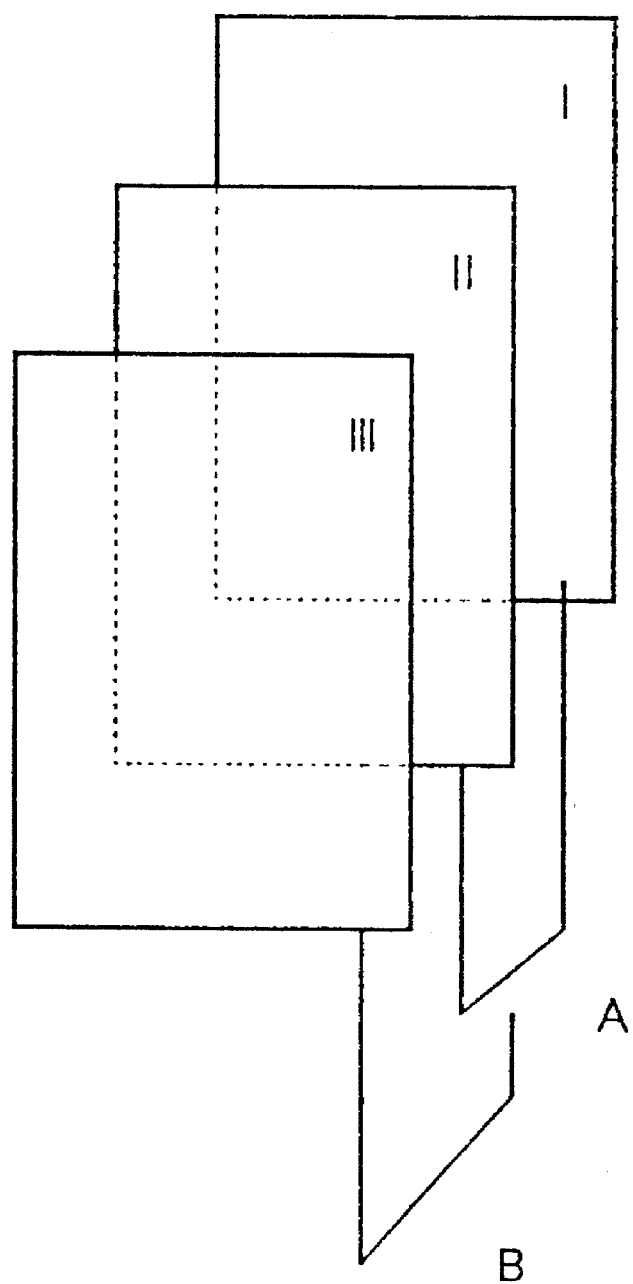
FIG. 11 is an explanatory diagram showing the cellophane function, according to the invention.

The cellophane process is carried out for each dot, as shown in FIG. 11. The VDP unit, control unit and image data extension unit supply first to third pictures I to III, the correspondence being arranged for each dot in accordance with picture priorities supplied from the units.

For example, if the priority is set on a dot in the order of "VDP > control unit > image data extension unit", the third picture III is used for the VDP unit, the second picture II is used for the control unit and the first picture I is used for the image data extension unit, respectively. In this case, when the cellophane instruction is set on the second picture II (for example, the BMG1 picture of the control unit), the cellophane process is carried out on the first and second pictures I and II in accordance with the cellophane coefficient, which corresponds to the value set in the coefficient register of the second picture II. Further, if the cellophane instruction is set on the third picture III (for example, the BG picture), the cellophane process is carried out on the third picture III and the picture which has been cellophane processed between the first and second pictures I and II.

If the cellophane instruction is not set on the second picture II only, the cellophane process is carried out between the second and third pictures II and III because the first picture I is blinded by the second picture II. The second picture II, however, does not blind the first picture at its chromakey portion. In this case, even if the cellophane instruction is set on the first picture I, the function is invalid. The cellophane instruction is set on and off dot-by-dot for each picture.

It is impossible to use the cellophane function in the same device (the VDP, control unit and image data extension unit), that is, for example the cellophane arithmetic can not be carried out between BMG1 and BMG2 in the control unit, and between the sprite picture and BG picture in the VDP unit. In other words, each of the VDP and control unit supplies one dot data of one picture selected in accordance with its internal priority, so that the cellophane process can not be carried out between two pictures in the same device.

According to the front and back cellophane functions, cellophane arithmetic is performed between a selected picture and a fixed color picture having single color. The color of the fixed color picture is set at the fixed color register.

Figure 12:
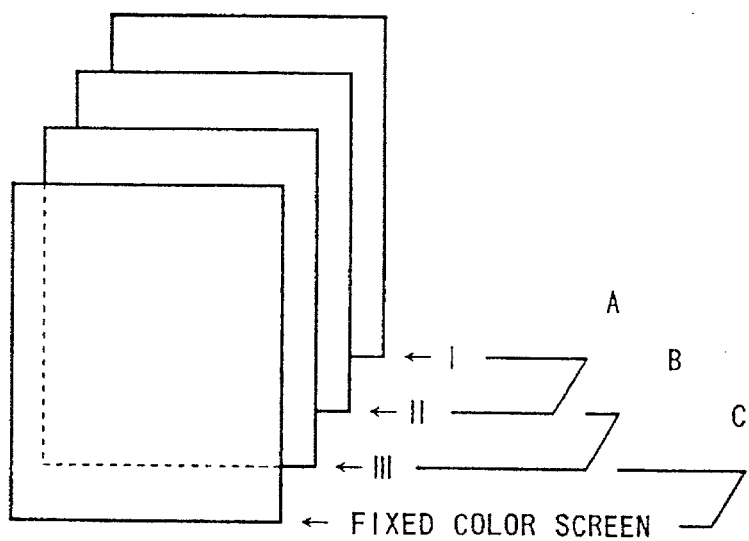
FIG. 12 is an explanatory diagram showing a front cellophane function, according to the invention.

In the front cellophane function, pictures supplied from the VDP unit, control unit and image data extension unit are cellophane processed and then the cellophane arithmetic is carried out on the pictures with the fixed color picture, as shown in FIG. 12. In this arithmetic, a value "1" of the coefficient register is used as the cellophane coefficient.

Figure 13:
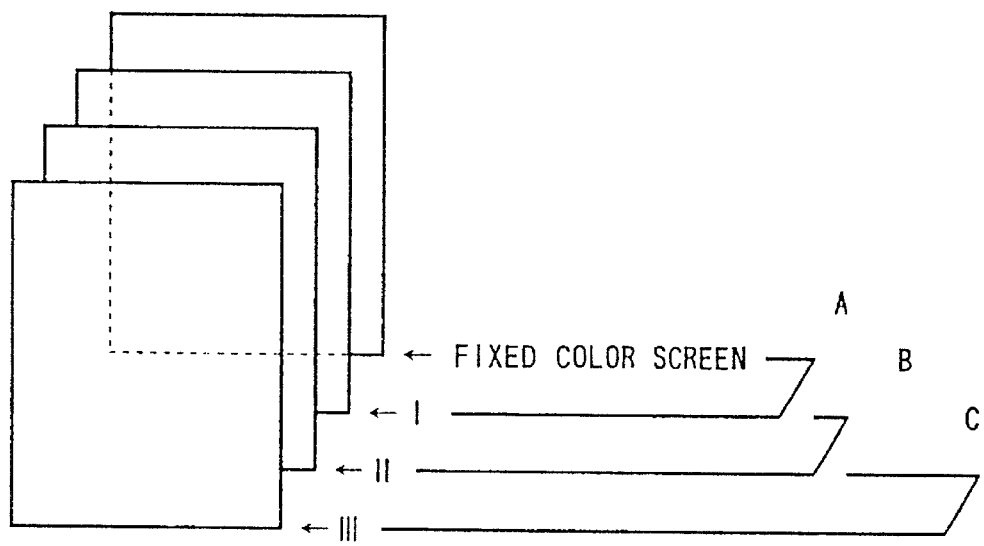
FIG. 13 is an explanatory diagram showing a back cellophane function, according to the invention.

In the back cellophane function, a picture having the lowest priority picture selected from among pictures in the VDP unit, control unit and image data extension unit is cellophane processed with the fixed color picture, as shown in FIG. 13. Then the second lowest priority picture is cellophane processed in the same manner as the lowest priority picture. In the back cellophane function, a value of the coefficient register set for the first picture is used as the cellophane coefficient. The front and back cellophane processes can not be carried out at the same time. Settings for front and back cellophane process are effective from the following horizontal synchronization period.

All sprites in the VDP are recognized as sprite pictures, so that the all sprites are cellophane processed basically when the cellophane instruction is set on the sprite picture. However, it is possible that specific sprites are not cellophane processed by the following method. When the cellophane instruction is not set on a color pallet bank number of a specific sprite by an SP sprite individual set register, dots in the specific sprite are treated as in a condition that the cellophane instruction is set on the specific sprite picture. This function is useful only when the cellophane arithmetic is carried out on the sprite picture. Therefore, if the cellophane instruction is set on a picture having a priority higher than that of the sprite picture, any sprite picture is cellophane processed.

The video encoder unit contains a synchronizing signal generating circuit, so that a dot clock, horizontal synchronizing signals -HSYNCA, -HSYNCB and -HSYNCC and a vertical synchronizing signal -VSYNC are supplied to peripheral devices when a chrominance subcarrier frequency of 12 colors is supplied to the encoder unit. The synchronizing signal generating circuit has an external synchronizing function, that is, an image can be displayed in synchronization with an external image.

In the D/A converter of the video encoder, a YUV signal of 8 bits is converted into an analog signal. If a UV signal contains only 4 bits like pallet data, "0000" data are added to the last figure of the UV signal to make it 8 bit data. The Y data are converted into an analog signal in linear fashion, for example, "00h" data are converted to a black color signal and "FFh" data are converted to a white color signal.

The U and V data are also converted to analog signals in linear fashion. In the analog signals, over and under "80h" data are expressed as positive and negative, respectively, because the U and V data have polarities.

The color depth varies in series with the difference value from "80h." When the data is "00h" or "FFh," the color becomes the deepest. When both the U and V are "80h," no color is expressed. The color hue is defined by the ratio between the difference values of the U and V signals from "80h," and the polarities thereof.

In the D/A conversion process, it may be selected whether the Y signal is treated with a synchronizing signal, and whether the U and V signals are modulated by chrominance subcarrier. If the chrominance subcarrier modulation is selected, color burst is superimposed on the U signal at a predetermined timing and amplitude. The D/A converter is of a current adding type, that is, a voltage conversion is carried out in accordance with the input impedance of external circuits.

In an external circuit, when predetermined analog arithmetic operations are performed using the Y signal with no synchronizing signal and the non-modulated UV signal, an RGB signal is generated. When the Y signal with synchronizing signal and the modulated UV signal are mixed by an external circuit, a composite video signal for the CRT display monitor is generated.

FIGS. 14 to 16 show the arrangements of an address register, the status register and a control register in the video encoder unit, respectively. The status and control registers are indirectly accessed through the address register.

The address register (AR) specifies internal registers R00 to R15 in the video encoder unit. The status register holds the current information of the displayed image.

In the status register;

(a) An "AR" at the 0th to 4th bits indicates the current value of the address register.

(b) A "RASTERCOUNT" at the 5th to 13th bits indicates a raster number of the current display in the display period of 22 to 261. The raster number set at the "RASTERCOUNT" does not correspond to a scanning line number defined by the NTSC signal. The raster number becomes "iFFh" when an external synchronizing signal is disturbed.

(c) An "O/E" at the 14th bit indicates whether an image is displayed at odd fields (1) or even fields (0) in an interlace mode.

(d) A "DISP" at the 15th bit indicates whether the video encoder is working in a display period (H blank, V blank). "0" and "1" are set at the 15th bit in the display period and non-display period, respectively.

In the control register (CR : R00), the 8th to 14th bits and the others are available from the following horizontal and vertical periods, respectively.

(a) A "DCC" at the 0th and first bits specifies a display mode whether the interlace or non-interlace mode, as shown in FIG. 17.

(b) An "EX" at the second bit specifies whether an external synchronization is carried out. When "1" is set at the second bit, free-operation is performed until an external synchronizing signal of proper frequency is detected, and then the free-operation is locked. On the other hand, when "0" is set at the second bit, the external synchronizing operation is generally reset. However, in some cases, the external synchronizing operation may be reset when the external synchronizing signal is greatly disturbed.

(c) A "DCT7" at the third bit specifies whether an image is displayed by 320 dots in the horizontal direction. That is, when "1" is set at the third bit, the 320 dot horizontal display is carried out. In this mode, the dot clock of the VDP unit attains only 7 MHz frequency, so that the cellophane function becomes disabled.

(d) "Blanking bits" at the 8th to 14th bits specify whether the pictures BG, SP, BM0, BM1, BM2, BM3 and RAIN are displayed, respectively. The instruction is available from the following horizontal period.

| R00 | bit 8  | 0 : BG not displayed   | 1 : BG displayed   |
|-----|--------|------------------------|--------------------|
| R00 | bit 9  | 0 : SP not displayed   | 1 : SP displayed   |
| R00 | bit 10 | 0 : BMG0 not displayed | 1 : BMG0 displayed |
| R00 | bit 11 | 0 : BMG1 not displayed | 1 : BMG1 displayed |
| R00 | bit 12 | 0 : BMG2 not displayed | 1 : BMG2 displayed |
| R00 | bit 13 | 0 : BMG3 not displayed | 1 : BMG3 displayed |
| R00 | bit 14 | 0 : IDCT/RT image not displayed | 1 : IDCT/RT image displayed |

If all the "blanking" bits are set at "0", that is, are reset, a black color is supplied as a YUV output (Y=00h, U=80h and V=80h).

Next, the operation of the address and status registers is now explained.

Step 1: -CET (chip enable) and A1 terminals are set at "L" whereby the address register (AR) is accessed. Then, a register number of a register to be accessed next is written in the address register.

Step 2: Then, the A1 terminal is changed to "H" while the -CET terminal keeps "L" whereby the register written in the address register is selected. Then, predetermined data are written into or read from the selected register.

In these steps, the content of the address register is maintained at the current value until the address register is rewritten. Therefore, the first step may be omitted when the same register is again accessed.

When the address register is read, the register is changed to the status register. The status register holds information such as the raster count value and interlace state.

The data bus to be used is selected between 8 and 16 bit types by an EX8/-16 terminal. While the 8 bit type is used, lower and upper bytes of the register are accessed by setting an A0 terminal at "0" and "1", respectively. On the other hand, while the 16 bit type is used, the level at the A0 terminal is ignored, because 16 bits data can be accessed directly.

FIGS. 18 to 25 show the configurations of a color pallet address register, color pallet data write register, color pallet address offset register 1, color pallet address offset register 2, color pallet address offset register 3, color pallet address offset register 4, priority register 1, and priority register 2, respectively.

The color pallet address register (CPA: R01) holds a color pallet address to be used when the color pallet RAM is accessed by the CPU, as shown in FIG. 18. The color pallet data write register and color pallet data read register are accessed in accordance with the color pallet address held in the color pallet address register. The color pallet address register is automatically incremented each time after the color pallet data write and read registers are accessed.

The color pallet data write register (CPW: 02) holds YUV data to be written at the address CPA in the color pallet RAM by the CPU, as shown in FIG. 19. Each of the Y, U, and V data are indicated by positive whole numbers. Each of the U and V data are treated as 8 bits data by adding "0000" at the end thereof, because the D/A converter treats 8 bits data only. The writing process may carried out continuously by the automatic increment function of the color pallet address register.

When the 8 bit data bus is used, the writing process is carried out in the order of the last half bytes to the first half bytes, because the data are written in the register after the writing process for the first half data is carried out. The increment process of the CPA is also carried out after the first half data are written in the register.

The color pallet data read register (CPR: R03) holds YUV data to be read from the color pallet RAM by the CPU. The reading process may carried out continuously by the automatic increment function of the color pallet address register.

When the 8 bit data bus is used, the reading process is carried out in the order of the last half bytes to the first half bytes, because the increment process is carried out after the first half data are read out.

The color pallet address offset register 1, shown in FIG. 20, is used for specifying which color pallet is used first for each unit of the VDP pictures. Actually, a double value of that held in the register is used as the offset value for the color pallet address. The address offset value is available from the following horizontal display period.

SP color pallet address = SP color pallet data + (SP color pallet offset) ×2

BG color pallet address = BG color pallet data + (SP color pallet offset) ×2

The color pallet address offset register 2, shown in FIG. 21, is used for specifying which color pallet is used first for each unit of the image pictures supplied from the control unit. In this register, offset values are set for BM0 and BM1, respectively.

Actually, a double value of that held in the register is used as the offset value for the color pallet address. The address offset value is effective from the following horizontal display period.

BMG0 color pallet address = BMG0 color pallet data + (BMG0 color pallet offset) ×2

BMG1 color pallet address = BMG1 color pallet data + (BMG1 color pallet offset) ×2

The color pallet address offset register 3, shown in FIG. 22, is also used for specifying which color pallet is used first for each of the image pictures supplied from the control unit. In this register, offset values are set for BM2 and BM3, respectively.

Actually, double values of that held in the register are used as the offset values for the color pallet address. The address offset values are effective from the following horizontal display period.

BMG2 color pallet address = BMG2 color pallet data + (BMG2 color pallet offset) ×2

BMG3 color pallet address = BMG3 color pallet data + (BMG3 color pallet offset) ×2

The color pallet address offset register 4, shown in FIG. 23, is used for specifying which color pallet is used first for each run-length picture supplied from the image data extension unit.

Actually, a double value of that held in the register is used as the offset value for the color pallet address. The address offset value is effective from the following horizontal display period.

The color pallet address = run-length color pallet data + (run-length color pallet offset) ×2

The priority registers 1 and 2, shown in FIGS. 24 and 25, hold data of 3 bits for specifying priority orders of image pictures to be displayed. In these registers, a larger figure has higher priority and a lower figure has lower priority. The same figure is not allowed to be set in the different registers.

FIGS. 26 to 28 show chromakey-Y, chromakey-U and chromakey-V registers for the IDCT screen, respectively. The chromakey-Y (brightness) register, shown in FIG. 26, stores data for specifying the upper and lower limits of a Y component in the chromakey function. In this register, "00H" and "FFH" represent black and white, respectively, these data being effective from the next horizontal display period.

The chromakey-U (color difference) register, shown in FIG. 27, stores data for specifying the upper and lower limits of a U component in the chromakey function. In this register, set data are effective from the next horizontal display period.

The chromakey-V (color difference) register, shown in FIG. 28, stores data for specifying the upper and lower limits of a U component in the chromakey function. In this register, set data are effective from the next horizontal display period.

FIG. 29 shows a fixed color register (CCR : ROD), which is used for the front and back cellophane processing. The register stores Y data of 8 bits, U data of 4 bits and V data of 4 bits to specify a color, the data being set by the positive whole numbers. In this register, set data are effective from the next horizontal display period.

FIG. 30 shows a cellophane setting register (BLE : ROE), in which set data are effective from the next horizontal display period.

FIG. 31 to 37 show detail of the cellophane setting register, shown in FIG. 30.

FIG. 38 shows an SP cellophane setting register (SPBL : ROF). When the register specifies a color pallet bank (block) to be cellophane OFF, a sprite picture using the color pallet bank is not processed by the cellophane function. This register is effective only when a cellophane ON is set for the sprite picture in the cellophane setting register.

FIG. 39 shows a cellophane coefficient register, in which three pairs of data (1A, 1B), (2A, 2B) and (3A, 3B) are used. Each of Y, U and V data are divided into 9, "0/8" to "8/8," so that the coefficient may be varied by changing the numerator.

As mentioned before, according to the invention, the priority processing is performed for each unit of predetermined dots, and therefore, plural pictures which are composed of different numbers of dots may be superimposed on each other. Further, this system may use the cellophane and chromakey processing together with the priority function, and as a result, high performance image processing may be realized.

A cellophane coefficient register is provided with 3 regions each having 6 parameters. When the cellophane function is set to a certain picture, the cellophane coefficient number (1 to 3) is written in a specified portion of the register. If "0" is set at the specified portion, the picture is separated from the cellophane function. Values 9 to F for the cellophane coefficient register are not supported.

Figure 40:
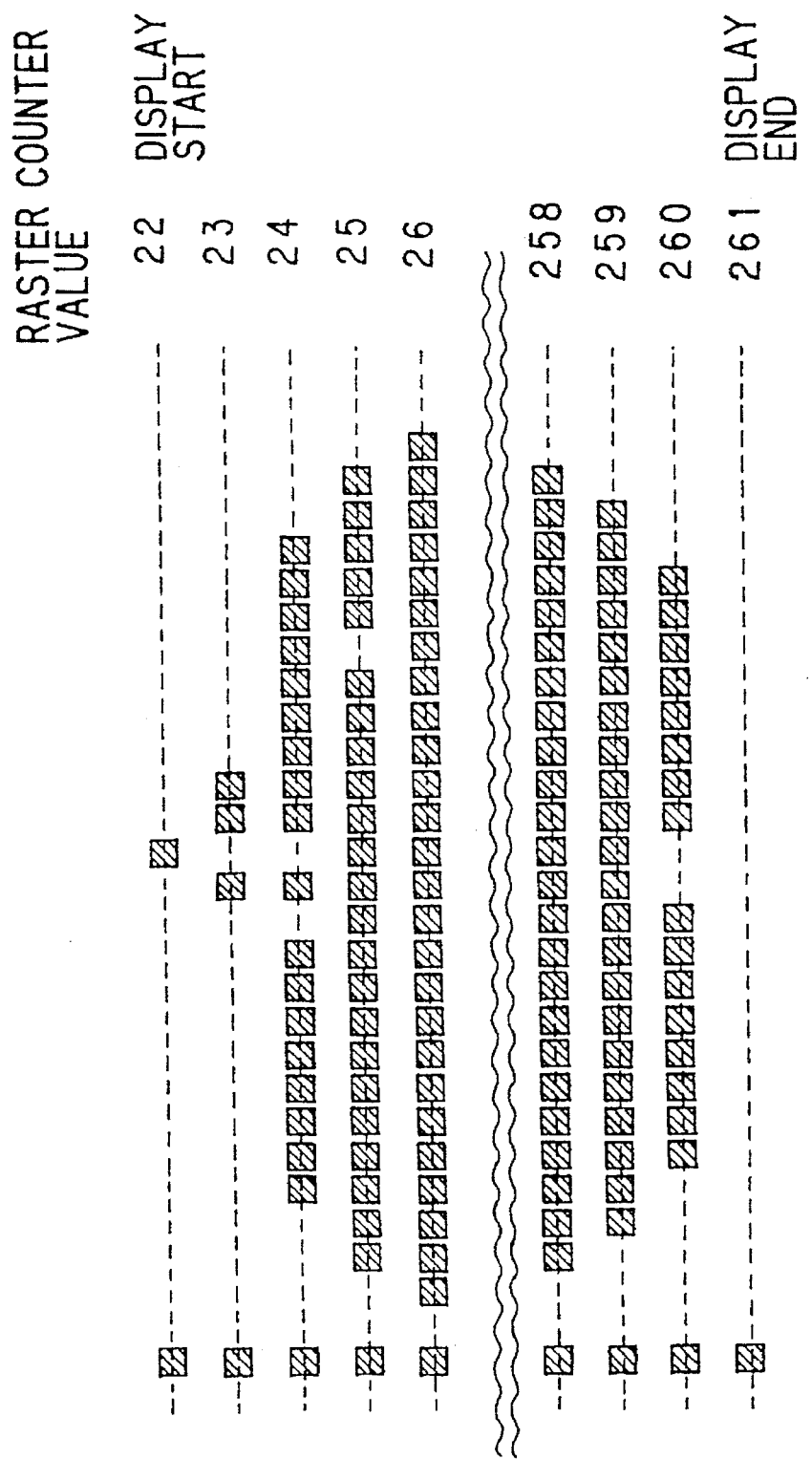
FIG. 40 is a diagram illustrating an image displayed in the non-interlace mode, according to the invention.

FIG. 40 shows image displayed in the non-interlace mode, and FIGS. 41 and 42 show images displayed in a general interlace mode and in the interlace mode with a ½ dot shift function, which will be explained later.

The video encoder may select an interlace mode, which is used for TV in general, and a non-interlace mode. In the interlace mode, scanning lines are fixed in number at 263 or 262, an O/E bit at a status register is "1" in an odd field period in first 1/60 seconds so that an image is displayed as in the non-interlace mode. In the next 1/60 second, that is in an even field period, an O/E bit becomes "0" to display an image located ½ line above the previous image. As a result, the distance between the first (odd) field and second (even) fields becomes narrow, and the image is displayed smoothly. In the same manner, these processes are repeated alternatively. If the odd and even fields have the same pictures, the image is displayed as if it seems being vibrated up and down with short interval. Image data are displayed field by field whereby the desired image is obtained.

In the interlace mode, it is possible to display a more higher quality image by using the ½ dot shift function therewith. According to the ½ dot shift function, picture elements are shifted ½ dot in a horizontal direction at one line interval. In this function, a mask is used for smoothing notched edge lines of the image, so that the displayed image is composed of 255.5 dots.

We claim:

1. An image processing apparatus, in which a plurality of different image pictures are displayed simultaneously, comprising:

a priority circuit which specifies the order of the plurality of different image pictures to be superimposed to each other;

cellophane means for selecting at least one picture to be displayed as transparent from the plurality of different image pictures;

coloring means for providing colors to the image pictures except for the selected picture(s);

means for superimposing the plurality of different image pictures in accordance with the order determined by the priority circuit; and a display unit coupled to the superimposing means for displaying the superimposed image pictures with colors specified by the coloring means.

2. The apparatus according to claim 1, wherein:

said plurality of different image pictures include a natural background picture and a moving image picture supplied from an external storage.

3. The apparatus according to claim 1, wherein: said cellophane means can specify the degree of transparency of selected image picture(s) by using cellophane coefficient(s) indicating how clear it is.

4. The apparatus according to claim 1, further comprising: chromakey means for specifying a key area within each image picture to be displayed as transparent so that a key area of a lower priority image picture can be displayed through a higher priority image picture.

5. A multimedia computer system, in which a plurality of image pictures are displayed with sound, comprising: a VDP (Video Display) unit which produces VDP image data including sprite and background images; a control unit for receiving natural background image data from an external storage and producing compressed image data including IDCT (Inverse Discrete Cosine Transformation) and RL (Run-Length) type of data; an image data extension unit coupled to the control unit for extending the compressed image data; a priority circuit which specifies the order of the plurality of different image pictures to be superimposed to each other; cellophane means for selecting none or some pictures to be displayed as transparent from the plurality of different image pictures, the selected picture(s) being called cellophaned pictures;

coloring means for providing colors to the image pictures except for the cellophaned picture(s);

a video encoder unit coupled to the VDP unit, control unit and the image data extension unit for superimposing the three different kinds of image data to be displayed in accordance with the order of image pictures determined by the priority circuit; and a display unit coupled to the video encoder unit for displaying the superimposed images with colors specified by the coloring means.

* * * * *